US012533772B2

(12) United States Patent
Fu

(10) Patent No.: US 12,533,772 B2
(45) Date of Patent: Jan. 27, 2026

(54) PLIERS WITH LOCKING JAW

(71) Applicant: Apex Brands, Inc., Apex, NC (US)

(72) Inventor: Zhihong Fu, Cary, NC (US)

(73) Assignee: Apex Brands, Inc., Apex, NC (US)

( * ) Notice: Subject to any disclaimer, the term of this patent is extended or adjusted under 35 U.S.C. 154(b) by 356 days.

(21) Appl. No.: 18/030,796

(22) PCT Filed: Oct. 7, 2021

(86) PCT No.: PCT/US2021/053953
§ 371 (c)(1),
(2) Date: Apr. 7, 2023

(87) PCT Pub. No.: WO2022/076674
PCT Pub. Date: Apr. 14, 2022

(65) Prior Publication Data

US 2023/0302609 A1 Sep. 28, 2023

Related U.S. Application Data

(60) Provisional application No. 63/088,789, filed on Oct. 7, 2020.

(51) Int. Cl.
*B25B 7/04* (2006.01)
*B25B 7/10* (2006.01)
*B25B 7/14* (2006.01)

(52) U.S. Cl.
CPC .................. *B25B 7/04* (2013.01); *B25B 7/10* (2013.01); *B25B 7/14* (2013.01)

(58) Field of Classification Search
CPC .... B25B 7/02; B25B 7/04; B25B 7/06; B25B 7/10; B25B 7/12; B25B 7/123;
(Continued)

(56) References Cited

U.S. PATENT DOCUMENTS 6,467,380 B1 * 10/2002 Azkona ..................... B25B 7/10 81/413
6,497,165 B1 * 12/2002 Schulz ...................... B25B 7/10 81/413

(Continued)

OTHER PUBLICATIONS

International Search Report Written Opinion from corresponding International Application No. PCT/US2021/053953 mailed Jan. 12, 2022, all pages cited in its entirety.

*Primary Examiner* — Robert J Scruggs
(74) *Attorney, Agent, or Firm* — Burr & Forman

(57) ABSTRACT

A hand tool includes a handle assembly, a jaw assembly, a locking assembly, and an adjustment assembly. The handle assembly may include a first handle and a second handle, each of the first and second handles having a proximal end and a distal end. The jaw assembly may include a first jaw and a second jaw. The first jaw may be attached to the proximal end the second handle via a transition region comprising an adjustment channel. The locking assembly may be configured to enable the first and second jaws to be locked at a selected distance from each other in a locked state. The adjustment assembly may include the adjustment channel and a bite adjustment member configured to enable the selected distance to be modified in an unlocked state based on a position of the bite adjustment member in the adjustment channel.

19 Claims, 8 Drawing Sheets

(58) Field of Classification Search
CPC .... B25B 7/14; B25B 7/16; B25B 7/18; B25B 13/10; B25B 13/12; B25B 13/20; B25B 13/34; B25B 13/36; B25B 27/14; B25B 27/146; B25G 1/005; B25G 1/063; B25G 1/066; B25G 3/38
See application file for complete search history.

(56) References Cited

U.S. PATENT DOCUMENTS

| | | | | |
|---|---|---|---|---|
| 2007/0044317 | A1* | 3/2007 | Critelli | B26B 17/02 30/173 |
| 2015/0183094 | A1 | 7/2015 | Phillips, Sr. et al. | |
| 2018/0021926 | A1* | 1/2018 | Wang | B25B 7/10 81/409.5 |
| 2018/0281156 | A1 | 10/2018 | Chen | |
| 2019/0255683 | A1 | 8/2019 | Moyer et al. | |
| 2020/0061778 | A1 | 2/2020 | Doyle et al. | |

* cited by examiner

PLIERS WITH LOCKING JAW

TECHNICAL FIELD

Example embodiments generally relate to hand tools and, in particular, relate to a pliers with a lockable jaw that can be easily adjusted.

BACKGROUND

Hand tools are commonly used across all aspects of industry and in the homes of consumers. Hand tools are employed for multiple applications including, for example, tightening, component joining, and/or the like. For some applications, specific hand tools that are adapted to a particular job that requires peculiar characteristics are common. Water pump pliers, which are also commonly referred to as tongue-and-groove pliers, slip joint pliers or pipe spanners, are commonly used in plumbing and other applications where the grip size can vary between relatively large sizes for spanning pipes and joint fittings and relatively small sizes for locking nuts.

Although other designs are possible, the common tongue-and-groove design includes top and bottom handles that are connected to bottom and top jaws, respectively. A channel is provided through which a series of different tongue-and-groove positions are defined to correspond to respective different bite sizes for the jaws. For many such pliers, the grip force applied is directly related to the force applied by the grip of the operator, and there is no ability to lock the grip. However, such locking capability may be desirable in some situations.

BRIEF SUMMARY OF SOME EXAMPLES

In an example embodiment, a hand tool that is both adjustable over a wide range of grip sizes, but also lockable, may be provided. The hand tool includes a handle assembly, a jaw assembly, a locking assembly, and an adjustment assembly. The handle assembly may include a first handle and a second handle, each of the first and second handles having a proximal end and a distal end. The jaw assembly may include a first jaw and a second jaw. The first jaw may be attached to the proximal end the second handle via a transition region comprising an adjustment channel. The locking assembly may be configured to enable the first and second jaws to be locked at a selected distance from each other in a locked state. The adjustment assembly may include the adjustment channel and a bite adjustment member configured to enable the selected distance to be modified in an unlocked state based on a position of the bite adjustment member in the adjustment channel.

In another example embodiment, a clamping assembly for locking an adjustable locking pliers having a handle assembly comprising a first handle and a second handle and a jaw assembly may be provided. The jaw assembly may include a first jaw and a second jaw. The clamping assembly may include a locking assembly and an adjustment assembly. The locking assembly may be configured to enable the first and second jaws to be locked at a selected distance from each other in a locked state. The adjustment assembly may include an adjustment channel and a bite adjustment member configured to enable the selected distance to be modified in an unlocked state based on a position of the bite adjustment member in the adjustment channel.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
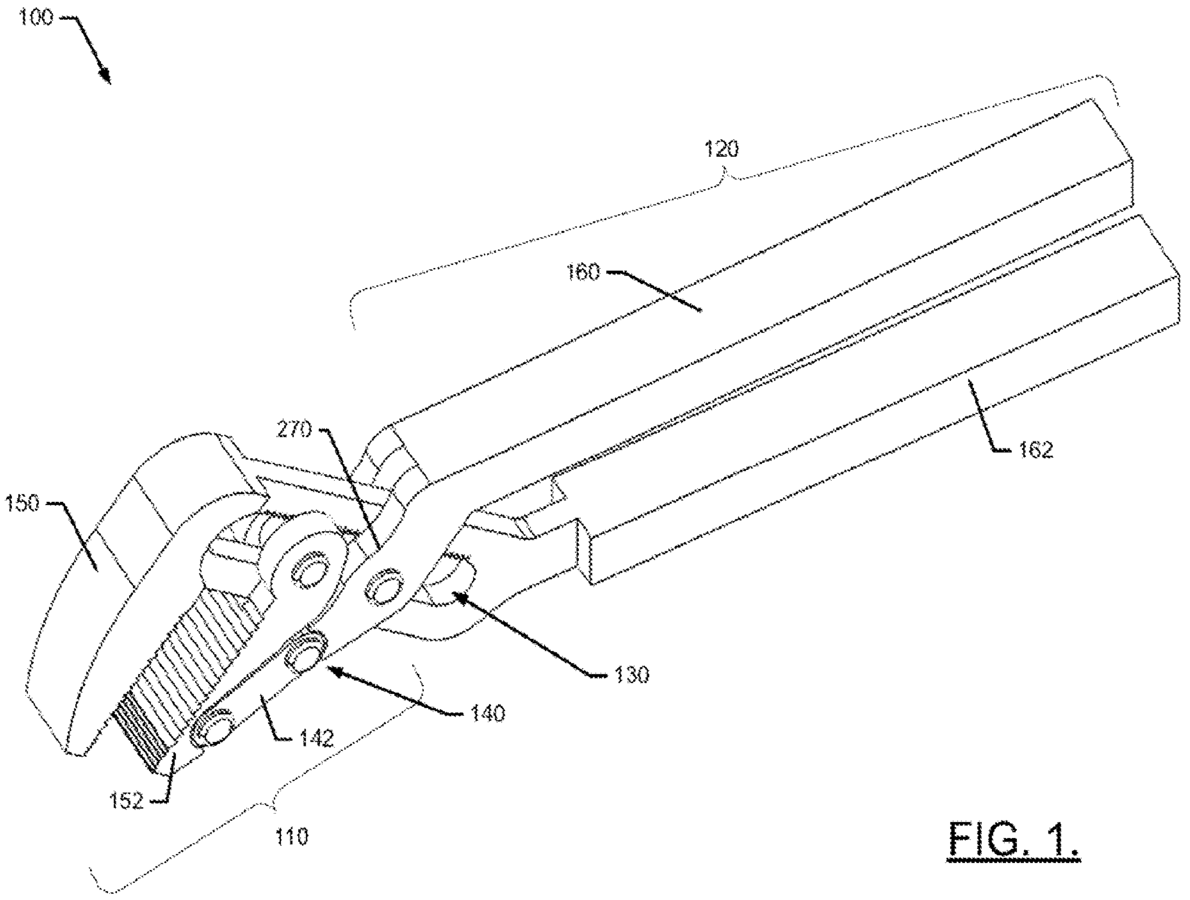
FIG. 1 illustrates a perspective view of a hand tool with an improved clamping assembly according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term “or” is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a pliers that can be easily adjusted to span a wide variety of grip sizes, but also be locked in each and every individually selectable grip size. FIGS. 1-8 show various views or portions of one example of a pliers capable of both having a wide variety of easily adjustable grip sizes, and of being locked in each one of those grip sizes. This is accomplished by providing a unique locking jaw as described in greater detail below.

Figure 2:
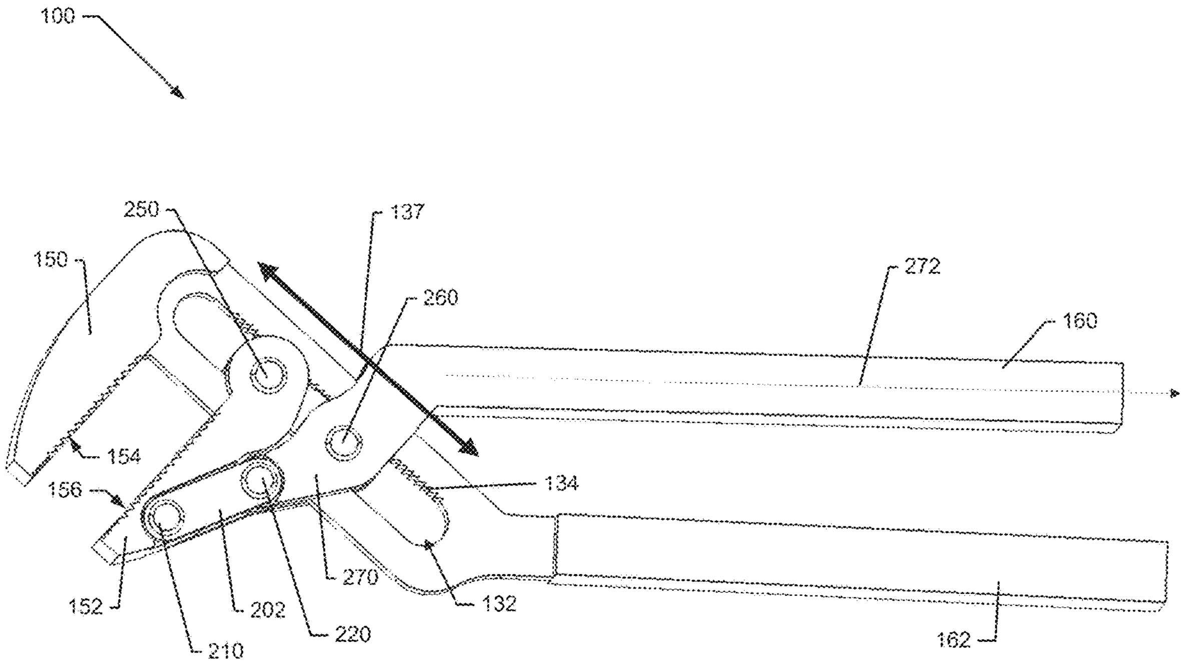
FIG. 2 is a side view of the hand tool of FIG. 1 in a locked state in accordance with an example embodiment.
Figure 3:
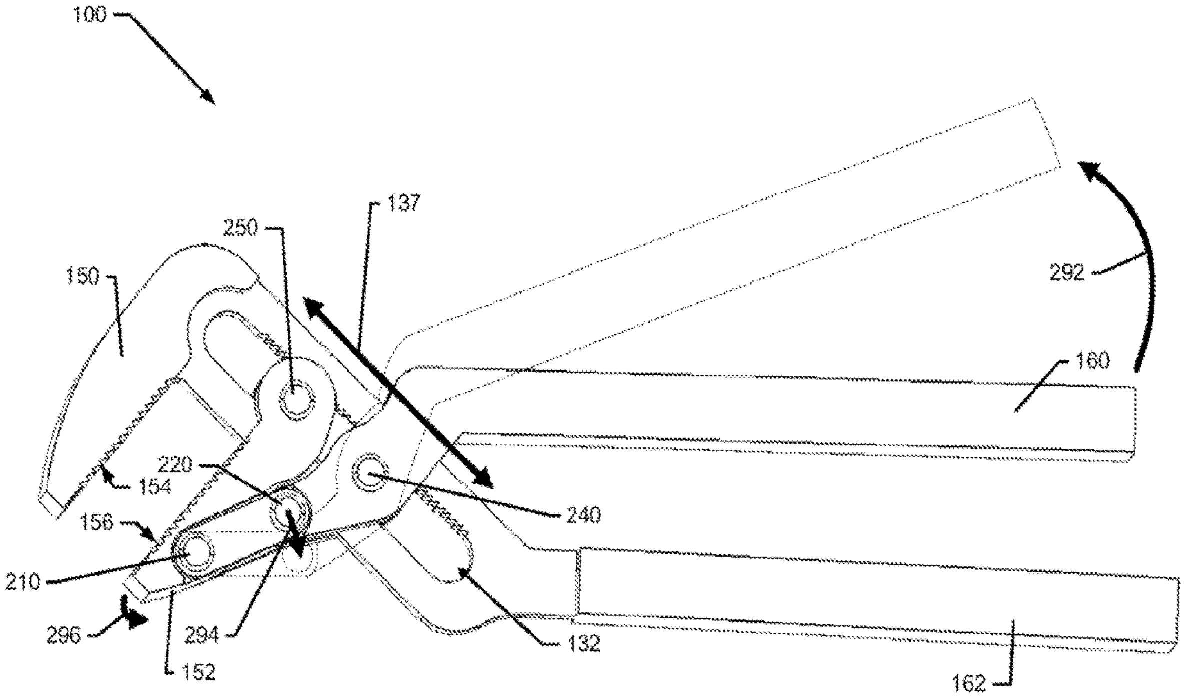
FIG. 3 is side view of the hand tool of FIG. 2 showing changes associated with transitioning to an unlocked state in accordance with an example embodiment.
Figure 4:
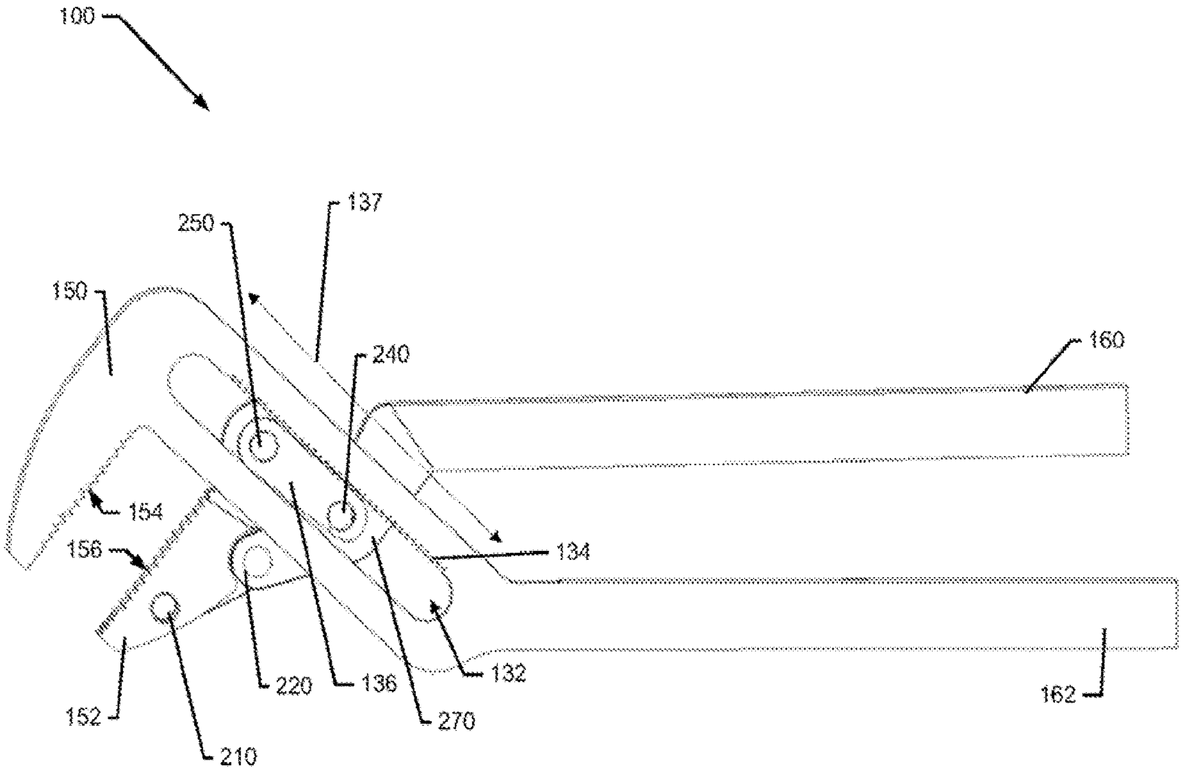
FIG. 4 is a cross section view of the hand tool bisected symmetrically in accordance with an example embodiment.
Figure 5:
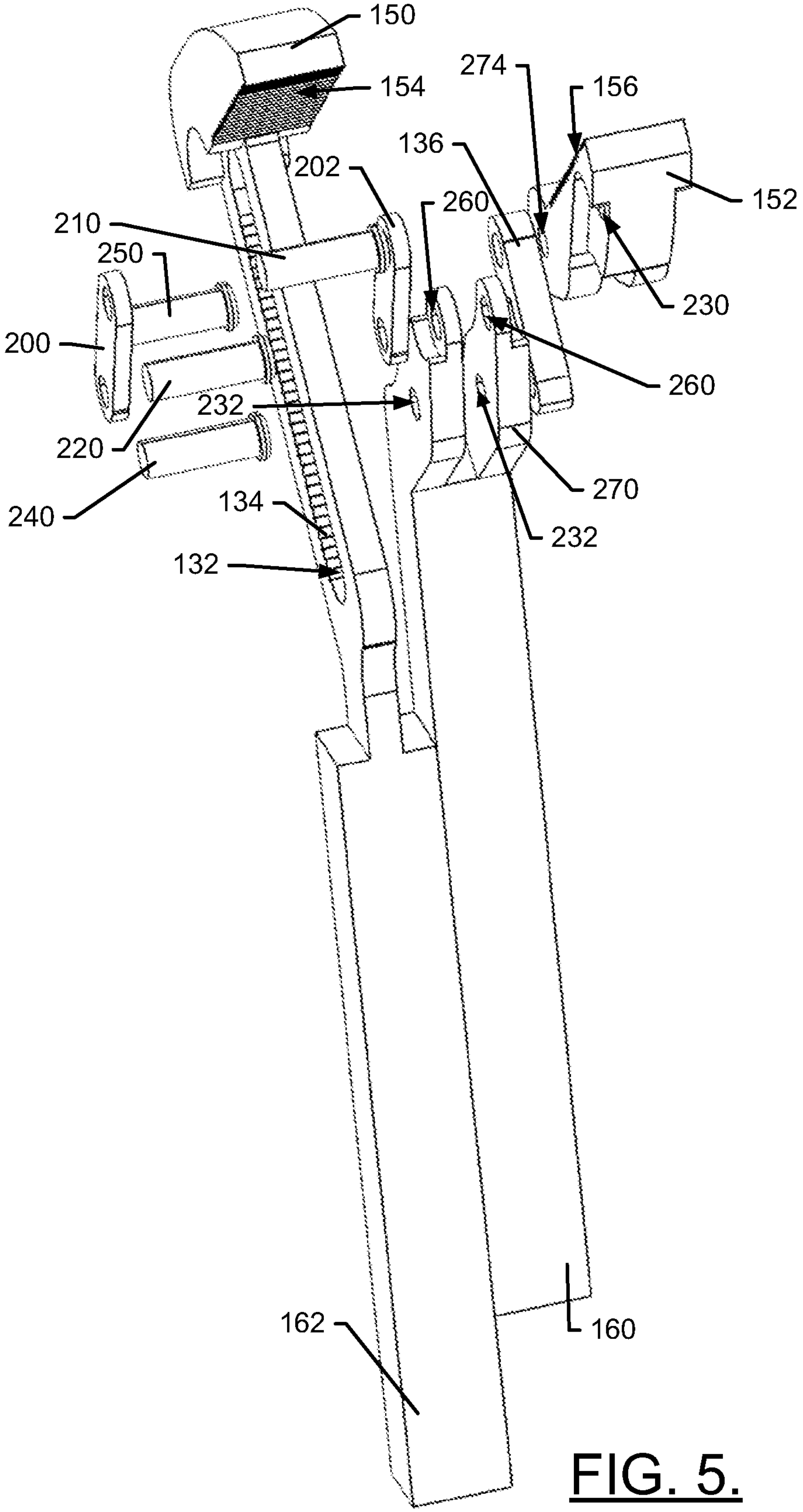
FIG. 5 is a exploded perspective view of the hand tool in accordance with an example embodiment.
Figure 6:
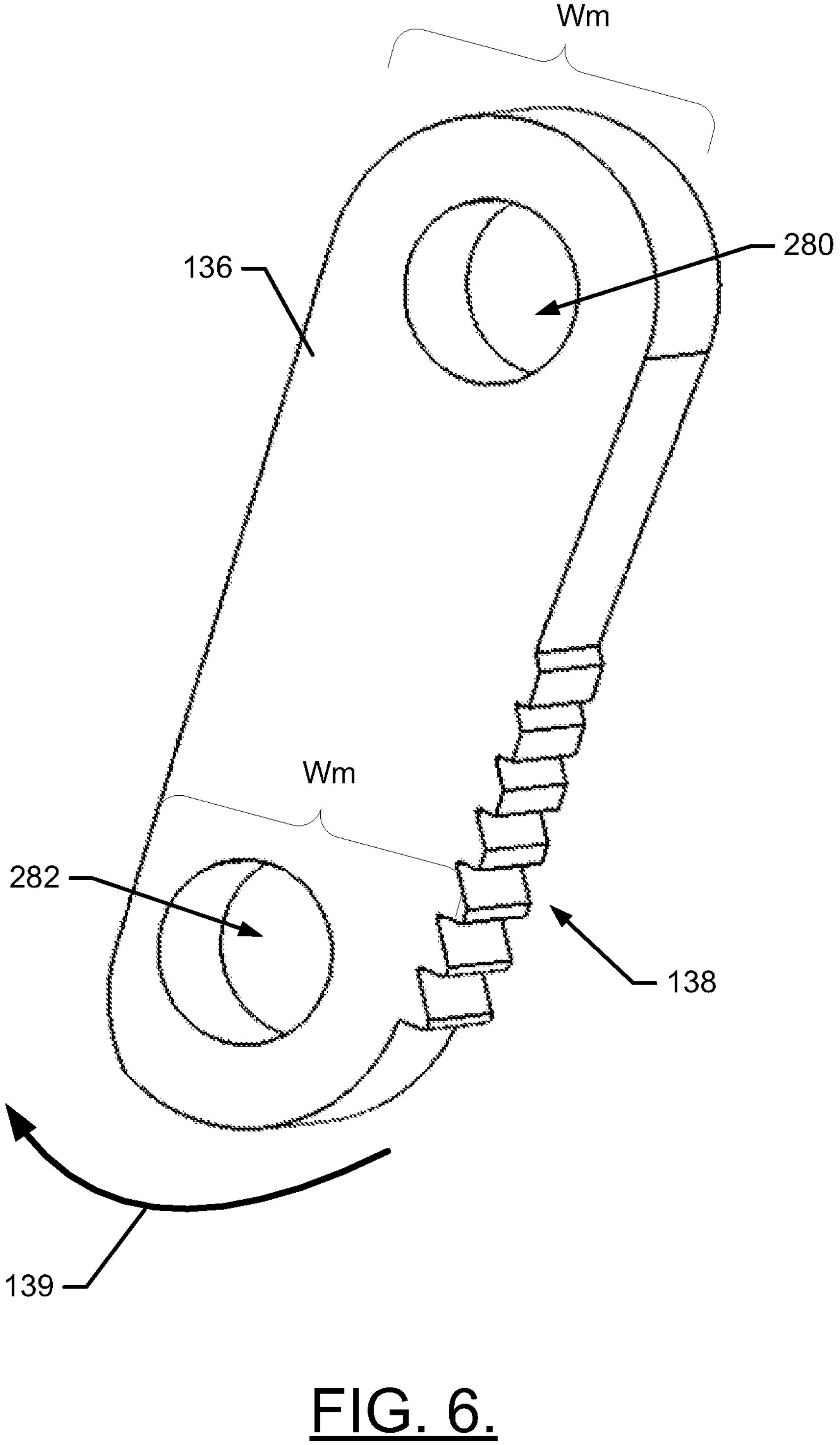
FIG. 6 illustrates a perspective view of a bite adjustment member in accordance with an example embodiment.
Figure 7:
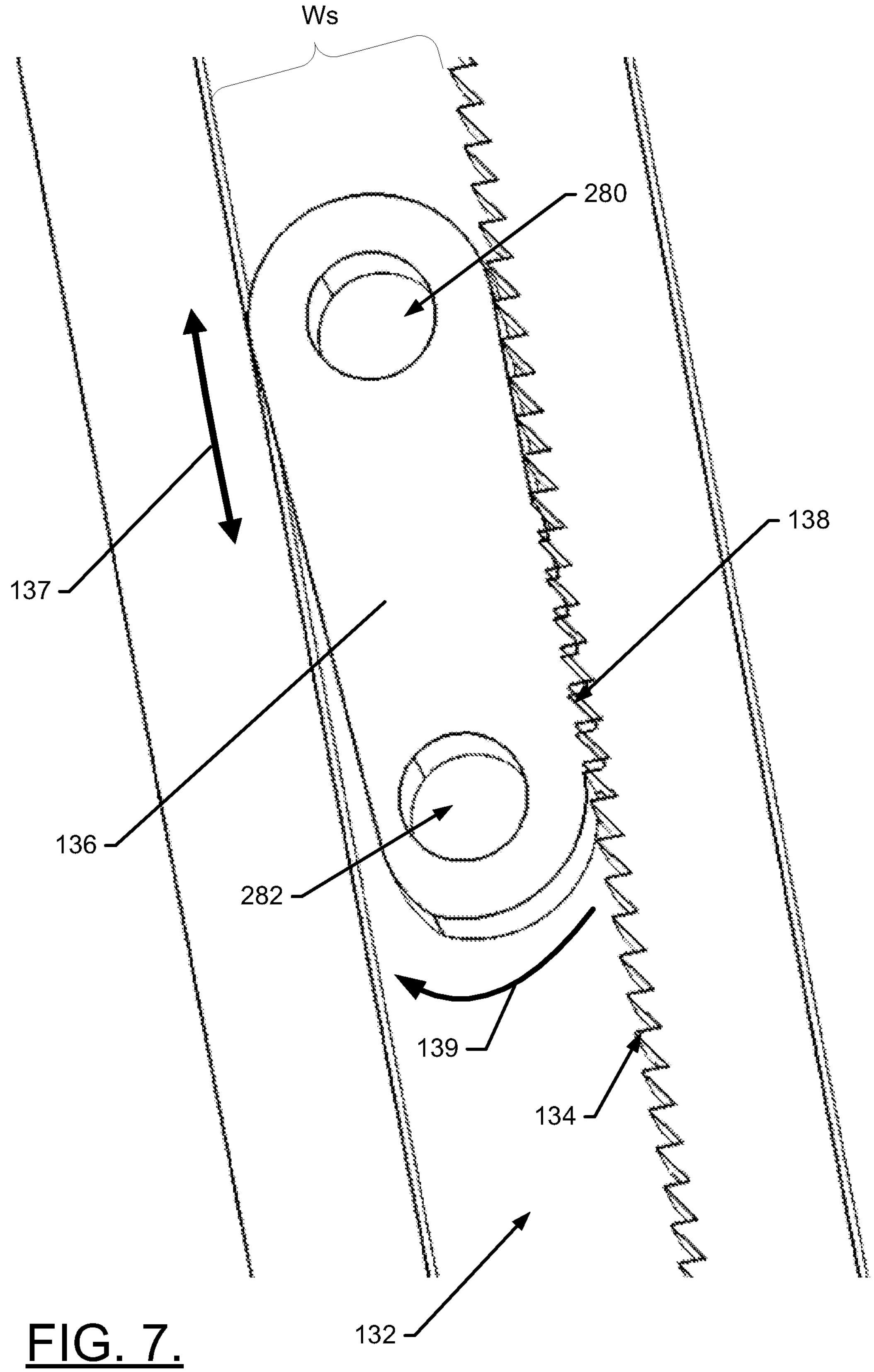
FIG. 7 is an isolated view of the bite adjustment member in an adjustment channel in accordance with an example embodiment.
Figure 8:
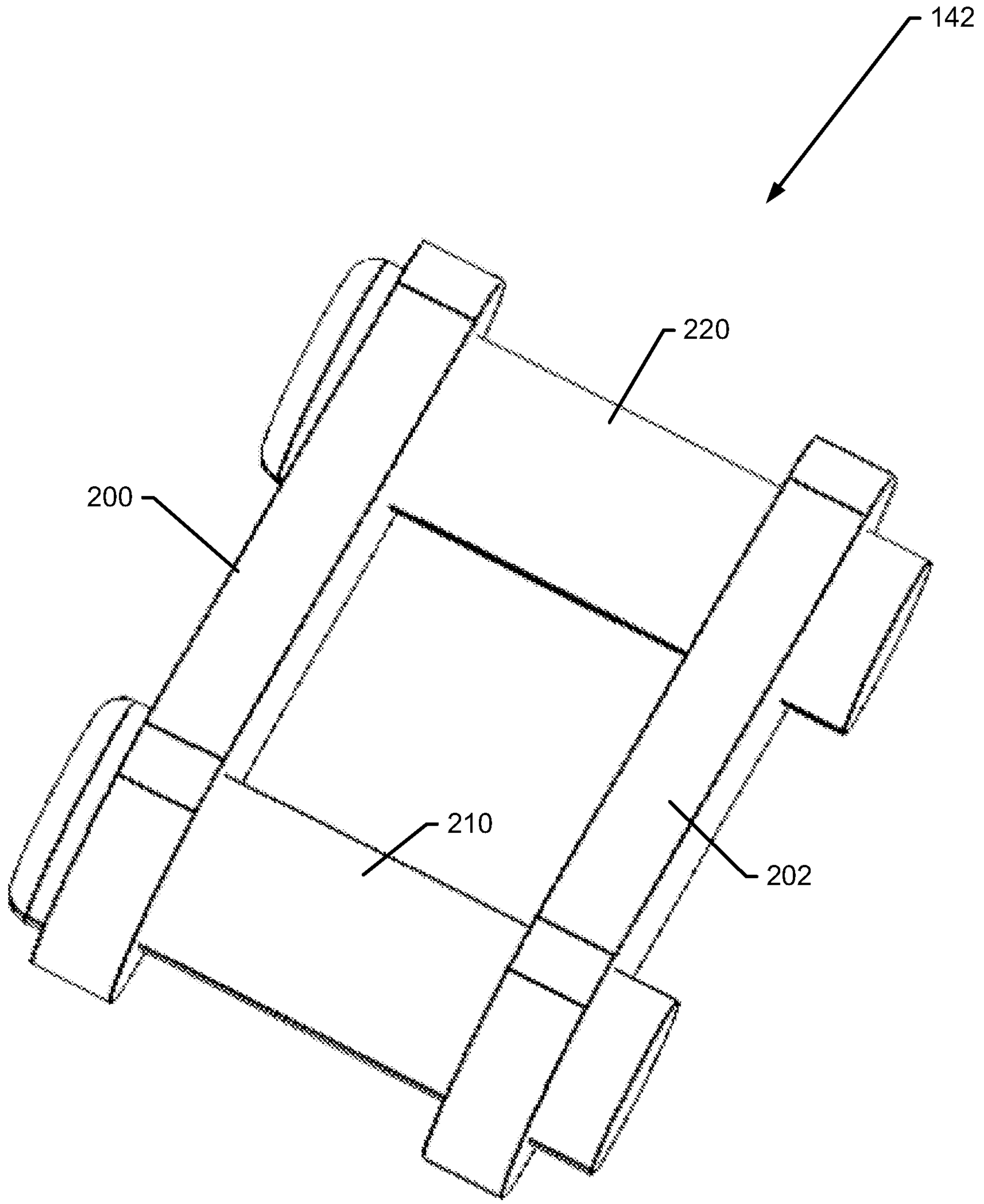
FIG. 8 is a top perspective view of a pivot connector of the hand tool in accordance with an example embodiment.

In this regard, FIG. 1 illustrates a perspective view of an adjustable pliers 100 having a locking jaw of an example embodiment. FIG. 2 shows a side view of the adjustable pliers in a locked state, and FIG. 3 shows the side view of FIG. 2 along with some position changes of individual components when the adjustable pliers 100 is in an unlocked state. FIG. 4 is a cross section view through the center of the adjustable pliers 100, and FIG. 5 is an exploded view of the adjustable pliers 100. FIGS. 6-8 show various parts of the adjustable pliers 100 that are used in adjusting bite size and locking the adjustable pliers 100 in greater detail.

Referring now to FIGS. 1-8, the adjustable pliers 100 may include a jaw assembly 110 at a first end thereof, and a handle assembly 120 at a second end thereof. An adjustment assembly 130 may be integrated into a transition region between the jaw assembly 110 and the handle assembly 120. Example embodiments may also include a locking assembly 140. Moreover, the locking assembly 140 and the adjustment assembly 130 may be configured to share components between the respective assemblies in some cases. In some example embodiments, the adjustment assembly 130 and the locking assembly 140 may each be parts of a clamping assembly that is configured to simultaneously operate to fix selection of a bite size of the jaw assembly 110 (e.g., a selected distance between the jaws of the jaw assembly 110) and shift to the locked state responsive to application of a gripping force on the handle assembly 120.

Terms such as top and bottom are generally provided in reference to the typical orientation of the corresponding components when held in the hand of a user. This typical orientation is also the one depicted in FIGS. 2 and 3. Thus, the terms top and bottom in reference to FIG. 3 correspond to the top and bottom of the page as viewed by a viewer that is viewing the page with the reference and figure numbers oriented properly, and also correspond to the typical orientation. However, more generic terms like first and second may also be used to distinguish the jaw and handle components that will be discussed herein.

The jaw assembly 110 may include a top jaw 150 and a bottom jaw 152 that are configured to face each other with at least one of the top jaw 150 or bottom jaw 152 being movable relative to the other in order to define locked and unlocked states as defined in greater detail below. Although not required, the top jaw 150 may include a substantially flat grip portion 154 that extends from a distal end of the top jaw 150 (relative to the handle assembly 120) toward the handle assembly 120. The grip portion 154 may include transversely extending teeth of similar or different sizes relative to one another. Although flat in this example, the grip portion 154 could include an arcuate shaped portion, or may employ one or more slanted surfaces (toothed or not toothed) therein. The bottom jaw 152 may also include a substantially flat grip portion 156 that extends from a distal end of the bottom jaw 152 (relative to the handle assembly 120). The grip portion 156 may also include transversely extending teeth of similar or different sizes relative to one another (and to the teeth of the grip portion 154 of the top jaw 150). Although flat in this example, the grip portion 156 could also include an arcuate shaped portion, or may employ one or more slanted surfaces (toothed or not toothed) therein. Media (e.g., a pipe, nut, or other component) may be placed between the top jaw 150 and bottom jaw 152, and the media may be gripped by the grip portions 154 and 146 via operation of the handle assembly 120.

The handle assembly 120 may include a top handle 160 and a bottom handle 162. In an example embodiment, the handle assembly 120 and the jaw assembly 110, and components thereof, may be pivotally connected to each in such a manner that the top jaw 150 and the bottom handle 162 are part of the same unitary piece of metallic material. Meanwhile, the top handle 160 and the bottom jaw 152 may be separate pieces of metallic material, which may be operably coupled to each other via adjustment assembly 130 and/or locking assembly 140.

In an example embodiment, the adjustment assembly 130 may include an adjustment channel 132. The adjustment channel 132 may be a slot formed in the metallic material formed in between the top jaw 150 and the bottom handle 162. The adjustment channel 132 may include a fixing array 134 (e.g., a first fixing array) disposed on one lateral side of the slot that forms the adjustment channel 132. The fixing array 134 may include a plurality of teeth or other repetitive grooves or recesses that help to define a surface against which a bite adjusting member 136 may alternately be fixed or released from. In this regard, the bite adjusting member 136 may be an elongated plate, slug or other metallic or rigid component that is sized to have a transverse width (Wm) that is slightly smaller than the transverse width (Ws) of the slot that forms the adjustment channel 132. Meanwhile, a thickness of the bit adjusting member 136 may be about equal to a thickness of the metal forming lateral sides of the adjustment channel 132. The bite adjusting member 136 may be moveable within the adjustment channel 132 (as shown by double arrow 137) in order to change a distance between the top jaw 150 and bottom jaw 152 as described herein.

The bite adjusting member 136 may also include an engaging array 138 (e.g., a second fixing array) on one lateral side thereof. The engaging array 138 may include a plurality of teeth or other shapes that are complementary to those of the fixing array 134 of the adjustment channel 132 over at least a portion of the length of the bite adjusting member 136. In an example embodiment, the engaging array 138 may extend only over about half of the lateral side of the bite adjusting member 136 on which the engaging array 138 is located. Moreover, the teeth or other projections of the engaging array 138 may be transitioned into in a gradual manner as shown in FIG. 6. This gradual transition may also coincide with the fact that the transverse width (Wm) of the bite adjusting member 136 is relatively constant over the length of the bite adjusting member 136. Thus, the addition of the engaging array 138 does not increase the width of the transverse width of the bite adjusting member 136. As such, the bite adjusting member 136 may pivot slightly (e.g., in the direction of arrow 139 on FIGS. 6 and 7) to transition between the locked state (in which the teeth of the engaging array 138 engage the teeth of the fixing array 134) and an unlocked state (in which the bite adjusting member 136 pivots slightly to move the teeth of the engaging array 138 out of engagement with the teeth of the fixing array 134).

When the adjustable pliers 100 is in the locked state, the bite adjusting member 136 may be pivoted slightly within the adjustment channel 132 such that the fixing array 134 of the adjustment channel 132 and the engaging array 138 of the bite adjusting member 136 are held in engagement with each other (as shown in the cross section view of FIG. 4, and the view of FIG. 7) thereby defining the locked state. In the locked state, the bite size of the jaw assembly 110 (i.e., the distance between the top jaw 150 and the bottom jaw 152 may be fixed based on the position of the bite adjusting member 136 within the adjustment channel 132. However, when the bite adjusting member 136 is pivoted slightly within the adjustment channel 132 (e.g., in the direction shown by arrow 139), the fixing array 134 of the adjustment channel 132 and the engaging array 138 of the bite adjusting member 136 may not be in engagement with each other and the bite adjusting member may be movable within the adjusting channel 132 (as shown by double arrow 137) thereby defining the unlocked state. Transitioning between the locked and unlocked state may be accomplished by alternately gripping (or closing toward each other) the top and bottom handles 160 and 162 or loosening the top and bottom handles 160 and 162 (i.e., moving them apart from each other) to operate the locking assembly 140.

In an example embodiment, the locking assembly 140 may include a pivot connector 142 that is configured to interface with the bottom jaw 152 and the top handle 160 via pivot links. Moreover, a number of other pivot links may also be defined to connect various other components of the adjustable pliers 100. In this regard, for example, the pivot connector 142 may be defined by a first plate 200, a second plate 202 and a first pivot link 210 and second pivot link 220. The first plate 200 of the pivot connector 142 may be disposed on one lateral side of the bottom jaw 152 and the second plate 202 disposed on the opposing lateral side of the bottom jaw 152 to mirror the first plate 200. The bottom jaw 152 may include a receiving opening 230 configured to pass laterally through the bottom jaw 152 at a portion thereof that is proximate to the distal end of the bottom jaw 152 (relative to the handle assembly 120). The first pivot link 210 may pass through a first end of each of the first plate 200 and the second plate 202 along with the receiving opening 230 to pivotally attach the pivot connector 142 to the bottom jaw 152.

The second pivot link 220 may pass through a second end of both the first plate 200 and the second plate 202 along with pivot openings 232 formed at a proximal end of the top handle 160 to pivotally attach the pivot connector 142 to the top handle 160. A third pivot link 240 may pivotally attach the top handle 160 and a lower portion of the bite adjusting member 136, while a fourth pivot link 250 pivotally attaches a proximal end of the bottom jaw 152 to a top portion of the bite adjusting member 136. In this regard, the third pivot link 240 may pass through pivot openings 260 formed in the top handle 160 at a portion thereof that is spaced apart from the proximal end and the pivot openings 232. Both sets of pivot openings 232 and 260 formed in the top handle 160 may be formed in a lever portion 270 of the top handle 160. The lever portion 270 may extend at an angle relative to a longitudinal centerline 272 of the top handle 160. Moreover, the lever portion 270 may include a small bend at a middle portion thereof (approximately at a location of the pivot openings 260.

The proximal end of the bottom jaw 152 may include a slot formed therein, and the bite adjusting member 136 may fit in the slot. The proximal end of the bottom jaw 152 may also include a pivot receivers 274 through which the fourth pivot link 250 may pass. A top orifice 280 may pass through the top portion of the bite adjusting member 136, and a bottom orifice 282 may pass through the bottom portion of the bite adjusting member 136. The fourth pivot link 250 may therefore pass through both the pivot receivers 274 in the bottom jaw 152 and the top orifice 280 of the bite adjusting member 136 to pivotally attach the bottom jaw 152 and the bite adjusting member 136. Meanwhile, the third pivot link 240 passes through the bottom orifice 282 and the pivot openings 260 of the lever portion 270 of the top handle 160 to pivotally attach the bite adjusting member 136 to the top handle 160 (or at least the lever portion 270 of the top handle 160).

As can be seen in FIG. 2, for example, the first and fourth pivot links 210 and 250 are a fixed distance from each other, and the third and fourth pivot links 240 and 250 are a fixed distance from each other. It may also be appreciated that the first and second pivot links 210 and 220 are a fixed distance from each other, and the second and third pivot links 220 and 240 are a fixed distance from each other. However, the first and third pivot links 220 and 240 are not a fixed distance from each other. Instead, when the first, second and third pivot links 210, 220 and 240 are in alignment with each other (e.g., all disposed with their respective axial centers along a same line (e.g., reference line 290 in FIG. 2), the distance between the first and third pivot links 210 and 240 is maximized. However, when the second pivot link 220 is moved out of the reference line 290 (as shown in dashed lines in FIG. 3), the distance between the first pivot link 210 and the third pivot link 240 is reduced slightly.

In practice, the second pivot link 220 may be moved out of alignment with the first and third pivot links 210 and 240 responsive to pivoting the top handle 160 upward in the direction of arrow 292. Such movement causes the second pivot link 220 to be carried downward in the direction of arrow 294 (shown in FIG. 3) and causes the distal end of the bottom jaw 152 to pivot slightly in the direction of arrow 296, while also causing the bite adjusting member 136 to pivot in the direction of arrow 139 shown in FIGS. 6 and 7. This disengages the teeth of the engaging array 138 from the teeth of the fixing array 134 to shift to the unlocked state, as described above. Meanwhile, gripping of the top and bottom handles 160 and 162 (i.e., moving the top handle 160 relative to the bottom handle 162 in a direction opposite that of arrow 292) causes the second pivot link 220 to be carried upward in a direction opposite of that shown by arrow 294, and causes the first, second and third pivot links 210, 220 and 240 to align along the reference line 290 and extend the distance between the first and third pivot links 210 and 240. The increased distance pushes the teeth of the engaging array 138 to engage the teeth of the fixing array 134 and both fix the bite size of the top and bottom jaws 150 and 152 at the corresponding distance therebetween, and also shift the adjustable pliers 100 to the locked state as described above.

As such, the location of the bite adjusting member 136 may be movable in the adjustment channel 132 (e.g., up and down according to double arrow 137) when the top handle 160 and bottom handle 162 are separated from each other. However, when gripping force is applied to bring the top handle 160 and bottom handle 162 closer to each other, the lever portion 270 of the top handle 160 may be responsible for positioning the pivot connector 142 to both set the bite size and lock the bite size at the corresponding distance between the top and bottom jaws 150 and 152. When a piece of media is disposed therebetween, the top and bottom jaws 150 and 152 may tend to be brought close to each other by gripping the handle assembly 120 until resistance is met when the media is encountered. Such resistance may prevent additional closure of the top and bottom jaws 150 and 152 toward each other, and thereby cause locking as described above (e.g., due to pivoting of the lever portion 270 causing the second pivot link 220 to move into the reference line 290).

Thus, each of the pivot links defines a pivotal connection between respective components that are joined at the corresponding pivot links. The adjustment assembly 130 and the locking assembly 140 may cooperate with each other to define how the respective components interface with each other to define a transition between the locked position of FIG. 2 and the open position shown in dashed lines in FIG. 3. Example embodiments therefore enable the locking assembly 140 and the adjustment assembly 130 to work together at the intersection of the jaw assembly 110 and the handle assembly 120 in order to simultaneously operate to fix selection of the bite size (i.e., a selected distance between the grip surfaces 154 and 156 of the top and bottom jaws 150 and 152) and shift to the locked state responsive to application of a gripping force on the handle assembly 120.

As can be appreciated from the example of FIGS. 1-8, example embodiments may define a hand tool with an improved capability for grasping media and adjusting the bite size of the jaws. In this regard, for example, the hand tool of an example embodiment may include a handle assembly, a jaw assembly, a locking assembly, and an adjustment assembly. The handle assembly may include a first handle and a second handle, each of the first and second handles having a proximal end and a distal end. The jaw assembly may include a first jaw and a second jaw. The first jaw may be attached to the proximal end the second handle via a transition region comprising an adjustment channel. The locking assembly may be configured to enable the first and second jaws to be locked at a selected distance from each other in a locked state. The adjustment assembly may include the adjustment channel and a bite adjustment member configured to enable the selected distance to be modified in an unlocked state based on a position of the bite adjustment member in the adjustment channel.

The hand tool and/or its components may include a number of modifications, augmentations, or optional additions, some of which are described herein. The modifications, augmentations or optional additions may be added in any desirable combination. For example, the locking assembly and adjustment assembly may be disposed at the intersection of the jaw assembly and the handle assembly and may be configured to simultaneously operate to fix selection of the selected distance and shift to the locked state responsive to application of a gripping force on the handle assembly. In an example embodiment, the second jaw may be pivotally connected to a pivot connector via a first pivot link. The pivot connector may be further pivotally connected to the first handle via a second pivot link. The pivot connector may be repositioned based on a position of the first handle relative to the second handle to alternately transition the hand tool between the locked state and the unlocked state. In some cases, a third pivot link may pivotally connect the first handle to the bite adjustment member and a fourth pivot link may pivotally connect the second jaw to the bite adjustment member. The hand tool may be in the locked state when the first, second and third pivot links are aligned and the hand tool may be in the unlocked state when the first, second and third pivot links are not aligned. In an example embodiment, the first handle may have a longitudinal axis and a lever portion that extends away from the longitudinal axis at the proximal end of the first handle. The second and third pivot links may be spaced apart from each other on the lever portion of the first handle. In some cases, a distance between the first and third pivot links may be maximized responsive to aligning the first and third pivot links to pivot the bite adjustment member in the adjustment channel. In some cases, the adjustment channel may include a fixing array and the bite adjustment member may include an engaging array configured to interface with the fixing array when the pivot of the bite adjustment member in the adjustment channel. In an example embodiment, the engaging array extends over less than half a length of the bite adjustment member. In some cases, the engaging array may include teeth configured to engage with teeth of the fixing array, and the teeth of the engaging array may increase in depth as proximity to an end of the bite adjustment member decreases. In an example embodiment, the adjustment channel may include a fixing array and the bite adjustment member comprises an engaging array configured to selectively interface with the fixing array based on a position of the first handle relative to the second handle. In some cases, the bite adjustment member may be configured to translate about a pivot link operably coupling the bite adjustment member to the second jaw responsive to rotation of the first handle to alternately engage and disengage the fixing array and the engaging array. In an example embodiment, the fixing array and the engaging array may each include one or more cooperating surfaces configured to engage each other in the locked state and disengage each other in the unlocked state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand tool comprising:

a handle assembly comprising a first handle and a second handle, each of the first and second handles having a proximal end and a distal end;

a jaw assembly comprising a first jaw and a second jaw, the first jaw being attached to the proximal end of the second handle via a transition region comprising an adjustment channel;

a locking assembly configured to enable the first and second jaws to be locked at a selected distance from each other in a locked state; and an adjustment assembly comprising the adjustment channel and a bite adjustment member configured to enable the selected distance to be modified in an unlocked state based on a position of the bite adjustment member in the adjustment channel, wherein the second jaw is pivotally connected to a pivot connector via a first pivot link, the pivot connector being further pivotally connected to the first handle via a second pivot link, wherein the pivot connector is repositioned between a first position and a second position based on a position of the first handle relative to the second handle to alternately transition the hand tool between the locked state and the unlocked state, respectively, and wherein the hand tool enters the locked state responsive to the first and second handles being pivoted towards each other and the hand tool enters the unlocked state responsive to the first and second handles being pivoted away from each other.

2. The hand tool of claim 1, wherein the locking assembly and adjustment assembly are disposed at the intersection of the jaw assembly and the handle assembly and are configured to simultaneously operate to fix selection of the selected distance and shift to the locked state responsive to application of a gripping force on the handle assembly.

3. The hand tool of claim 1, wherein a third pivot link pivotally connects the first handle to the bite adjustment member and a fourth pivot link pivotally connects the second jaw to the bite adjustment member, and wherein the hand tool is in the locked state when the pivot connector is in the first position and respective axial centers of the first, second and third pivot links are aligned along a straight line and the hand tool is in the unlocked state when the pivot connector is in the second position and the respective axial centers of the first, second and third pivot links are not aligned along the straight line.

4. The hand tool of claim 3, wherein the first handle has a longitudinal axis and a lever portion that extends away from the longitudinal axis at the proximal end of the first handle, and wherein the second and third pivot links are spaced apart from each other on the lever portion of the first handle.

5. The hand tool of claim 4, wherein a distance between the first and third pivot links is maximized responsive to aligning the first and third pivot links to pivot the bite adjustment member in the adjustment channel.

6. The hand tool of claim 5, wherein the adjustment channel comprises a fixing array and the bite adjustment member comprises an engaging array configured to interface with the fixing array when the pivot of the bite adjustment member in the adjustment channel.

7. The hand tool of claim 6, wherein the engaging array extends over less than half a length of the bite adjustment member.

8. The hand tool of claim 7, wherein the engaging array comprises teeth configured to engage with teeth of the fixing array, and wherein the teeth of the engaging array increase in depth as proximity to an end of the bite adjustment member decreases.

9. The hand tool of claim 1, wherein the adjustment channel comprises a fixing array and the bite adjustment member comprises an engaging array configured to selectively interface with the fixing array based on a position of the first handle relative to the second handle.

10. The hand tool of claim 9, wherein the engaging array extends over less than half a length of the bite adjustment member.

11. The hand tool of claim 9, wherein the bite adjustment member is configured to translate about a pivot link operably coupling the bite adjustment member to the second jaw responsive to rotation of the first handle to alternately engage and disengage the fixing array and the engaging array.

12. The hand tool of claim 11, wherein the fixing array and the engaging array each include one or more cooperating surfaces configured to engage each other in the locked state and disengage each other in the unlocked state.

13. A hand tool comprising:

a handle assembly comprising a first handle and a second handle, each of the first and second handles having a proximal end and a distal end;

a jaw assembly comprising a first jaw and a second jaw, the first jaw being attached to the proximal end the second handle via a transition region comprising an adjustment channel;

a locking assembly configured to enable the first and second jaws to be locked at a selected distance from each other in a locked state; and an adjustment assembly comprising the adjustment channel and a bite adjustment member configured to enable the selected distance to be modified in an unlocked state based on a position of the bite adjustment member in the adjustment channel, wherein the adjustment channel comprises a fixing array and the bite adjustment member comprises an engaging array configured to selectively interface with the fixing array based on a position of the first handle relative to the second handle, wherein the engaging array extends over less than half a length of the bite adjustment member, wherein the engaging array comprises teeth configured to engage with teeth of the fixing array, and wherein the teeth of the engaging array increase in depth as proximity to an end of the bite adjustment member decreases.

14. A clamping assembly for locking an adjustable locking pliers having a handle assembly comprising a first handle and a second handle and a jaw assembly comprising a first jaw and a second jaw, the clamping assembly comprising:

a locking assembly configured to enable the first and second jaws to be locked at a selected distance from each other in a locked state; and an adjustment assembly comprising an adjustment channel and a bite adjustment member configured to enable the selected distance to be modified in an unlocked state based on a position of the bite adjustment member in the adjustment channel, wherein the second jaw is pivotally connected to a pivot connector via a first pivot link, the pivot connector being further pivotally connected to the first handle via a second pivot link, wherein the pivot connector is repositioned between a first position and a second position based on a position of the first handle relative to the second handle to alternately transition the locking assembly between the locked state and the unlocked state, respectively, and wherein the locking assembly enters the locked state responsive to the first and second handles being pivoted towards each other and the locking assembly enters the unlocked state responsive to the first and second handles being pivoted away from each other.

15. The clamping assembly of claim 14, wherein the locking assembly and adjustment assembly are disposed at the intersection of the jaw assembly and the handle assembly and are configured to simultaneously operate to fix selection of the selected distance and shift to the locked state responsive to application of a gripping force on the handle assembly.

16. The clamping assembly of claim 15, wherein the adjustment channel comprises a fixing array and the bite adjustment member comprises an engaging array configured to selectively interface with the fixing array based on a position of the first handle relative to the second handle.

17. The clamping assembly of claim 16, wherein the engaging array comprises teeth configured to engage with teeth of the fixing array, and wherein the teeth of the engaging array increase in depth as proximity to an end of the bite adjustment member decreases.

18. The clamping assembly of claim 16, wherein the bite adjustment member is configured to translate about a pivot link operably coupling the bite adjustment member to the second jaw responsive to rotation of the first handle to alternately engage and disengage the fixing array and the engaging array.

19. The clamping assembly of claim 16, wherein the fixing array and the engaging array each include one or more cooperating surfaces configured to engage each other in the locked state and disengage each other in the unlocked state.

* * * * *